(12) United States Patent
Shin

(10) Patent No.: US 11,438,741 B2
(45) Date of Patent: Sep. 6, 2022

(54) COORDINATED TRANSPORTATION SYSTEM AND METHODS THEREOF

(71) Applicant: Honda Motor Co., Ltd., Tokyo (JP)

(72) Inventor: Koo Ho Shin, Huntington Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 16/773,831

(22) Filed: Jan. 27, 2020

(65) Prior Publication Data

US 2021/0235242 A1 Jul. 29, 2021

(51) Int. Cl.
| | |
|---|---|
| G05D 1/00 | (2006.01) |
| H04W 4/46 | (2018.01) |
| G05D 1/02 | (2020.01) |
| B60N 2/02 | (2006.01) |
| B60Q 1/00 | (2006.01) |
| B60Q 3/80 | (2017.01) |
| H04W 84/04 | (2009.01) |

(52) U.S. Cl.
CPC ............ *H04W 4/46* (2018.02); *G05D 1/0278* (2013.01); *G05D 1/0285* (2013.01); *G05D 1/0291* (2013.01); *B60N 2/0244* (2013.01); *B60Q 1/00* (2013.01); *B60Q 3/80* (2017.02); *G05D 1/0088* (2013.01); *G05D 2201/0213* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 7,450,603 B2 | 11/2008 | Nix et al. | |
| 10,334,050 B2 | 6/2019 | Kentley-Klay et al. | |
| 10,408,633 B2 | 9/2019 | Walenty et al. | |
| 2017/0104824 A1* | 4/2017 | Bajwa | H04L 65/40 |
| 2019/0020735 A1* | 1/2019 | Joo | H04W 4/40 |
| 2019/0063941 A1* | 2/2019 | Walenty | G01C 21/362 |
| 2019/0068582 A1 | 2/2019 | Kim et al. | |
| 2019/0205115 A1 | 7/2019 | Gomes | |
| 2019/0213876 A1* | 7/2019 | Yamada | G08G 1/0112 |
| 2019/0279440 A1 | 9/2019 | Ricci | |

(Continued)

FOREIGN PATENT DOCUMENTS

| | | |
|---|---|---|
| CN | 106791668 A | 5/2017 |
| CN | 107798860 B | 5/2019 |

(Continued)

*Primary Examiner* — James M McPherson
(74) *Attorney, Agent, or Firm* — Aaron Fong; American Honda Motor Co., Inc.

(57) ABSTRACT

The present disclosure relates to a coordinated transportation system and methods thereof. More particularly, this disclosure describes a system where passengers within two or more vehicles may enjoy a shared cabin experience. This may include, but is not limited to, a selection of music, sound clip, seat haptic, seat positioning, speaker setting, interior or exterior lighting, image or video for display, and drive mode to be shared among the vehicles. Vehicle formations to enhance the shared cabin experience may be formed. Furthermore, a global positioning system (GPS) coordinate may be established by a lead vehicle to provide other vehicles with the experience after those vehicles pass that coordinate.

4 Claims, 14 Drawing Sheets

(56) References Cited

U.S. PATENT DOCUMENTS

2022/0101611 A1* 3/2022 Lee .................. B60W 50/14
2022/0103789 A1* 3/2022 Jung .................. G08G 1/0968

FOREIGN PATENT DOCUMENTS

| FR | 3021478 A1 | 11/2015 |
|----|------------|---------|
| WO | 2015051684 A1 | 4/2015 |
| WO | 2019085031 A1 | 5/2019 |

* cited by examiner

BASED ON SYNC APP-DIFFERENT CONFIGURATIONS

ROW FORMATION

COORDINATED TRANSPORTATION SYSTEM AND METHODS THEREOF

BACKGROUND

Caravans may be formed when passengers or drivers choose to travel together in separate vehicles. Different motivations may be used to form caravans. In one example, a summer retreat may require the use of multiple vehicles to transport children to a camping ground. Often, one of those vehicles may take the lead. Other vehicles within the caravan may follow. Caravans may provide mutual support from one vehicle to another while traveling to their destination. This support may include entertainment.

If trips are long, however, passengers within the vehicles of the caravan may become restless or impatient. These passengers may call, text, or commutate with one another through their personal devices, such as smartphones, to remove these challenges and provide entertainment. Nevertheless, and especially among a large number of passengers in many vehicles, a single cohesive environment for which the passengers may provide mutual support to one another may be diminished through the use of only personal devices.

The present disclosure provides for a coordinated transportation system and methods thereof that addresses the above identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle is provided. The vehicle may include a transceiver, at least one processor, and a memory operatively coupled to the processor, the memory storing program instructions that when executed by the processor, causes the processor to perform processes. The processes may include registering with at least one other vehicle, connecting to the at least one other vehicle through the transceiver, defining a function for sharing, and transmitting the function to the at least one other vehicle through the transceiver, wherein the function is provided on the vehicle and the at least one other vehicle for a shared cabin experience.

In accordance with another aspect of the present disclosure, a coordinated transportation system is provided. The system may include two or more vehicles and a control system registering the two or more vehicles with one another. The control system may include defining a function for the two or more vehicles and providing the function within the two or more vehicles. The function may provide a shared cabin experience between the two or more vehicles.

In accordance with yet another aspect of present disclosure, a method for two or more vehicles is provided. The method may include registering the two or more vehicles and defining a function for the two or more vehicles. In addition, the method may include providing the function within the two or more vehicles for a shared cabin experience. The function may be at least one of a selection of music, sound clip, seat haptic, seat positioning, speaker setting, interior or exterior lighting, image or video for display, and drive mode.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to a coordinated transportation system and methods thereof. More particularly, this disclosure describes a system where passengers within two or more vehicles may enjoy a shared cabin experience. This may include, but is not limited to, a selection of music, sound clip, seat haptic, seat positioning, speaker setting, interior or exterior lighting, image or video for display, and drive mode to be shared among the vehicles. Vehicle formations to enhance the shared cabin experience may be formed. Furthermore, a global positioning system (GPS) coordinate may be established by a lead vehicle to provide other vehicles with the experience after those vehicles pass that coordinate.

Numerous other modifications or configurations to the coordinated transportation system and methods thereof will become apparent from the description provided below. For example, while the shared cabin experience is shown within vehicles, the system may be expanded to other modes of transportation such as trains, buses, aircraft, motorcycles, micro-mobility devices, chair lifts, or the like. The shared cabin experience may also be integrated as part of an autonomous or semi-autonomous vehicle. Advantageously, drivers and passengers (also known as parties) may share a similar or same experience as others removing any restlessness or impatience by them. New creations may also be developed and experienced by those within the coordinated transportation system. Other advantages will become apparent from the description provided below.

Figure 1:
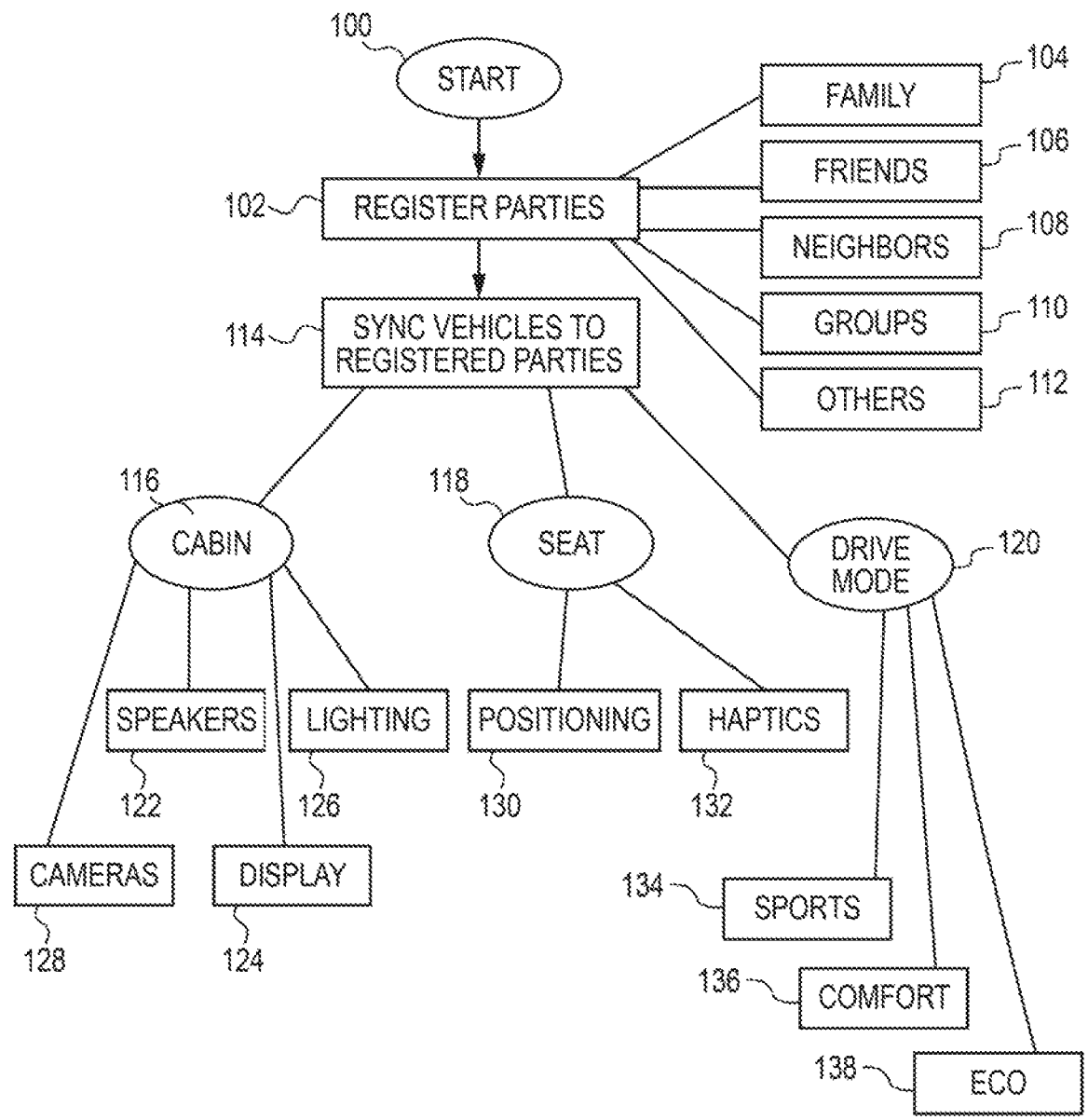
FIG. 1 is a schematic block diagram of an illustrative registration process to connect vehicles together for a coordinated transportation system in accordance with one aspect of the present disclosure.

Turning to FIG. 1, a schematic block diagram of an illustrative registration process to connect vehicles together for coordinated transportation in accordance with one aspect of the present disclosure is provided. The registration process may join parties that want to be connected through their travels, that is, caravanning. By registering or preregistering, the parties may be able to establish functions or features that they wish to use in a shared cabin experience. Fewer or more processes may be used which will become apparent from the discussion below.

The processes may begin at block 100. At block 102, the coordinated transportation system may register the parties to connect them with one another. A number of different interfaces having graphical user interfaces (GUIs) may be used to accomplish the registration process. This may either occur on a user's smartphone, laptop, or other personal device. Connections with these devices to enable the shared cabin experience may occur remotely or locally, which will be discussed in further details below.

Those vehicles that have been registered within the caravan may access this information. The registration may occur by each vehicle placing a V2V signal indicating their intention to be synchronized with one another. After acceptance, those vehicles may be begin sharing their information with one another.

In one embodiment, registering or preregistering the parties may occur in the future. The registration process may occur hours, weeks, months, or years before a trip occurs. The registration may be made on a previous understand of a similar or proximate destination of the parties. The registration process may occur on the fly or at the moment as well. For example, if a group of vehicles are near one another, which may be based on GPS coordinates, each may be part of the coordinated transportation system.

Different parties that may be grouped together into the coordinated transportation system may include family 104, friends 106, neighbors 108, social groups 108, or others 112. Typically, the parties may be affiliated through a similar or proximate destination. The drivers or passengers may not know each other, but their common interest may group them into the system.

In one embodiment, the coordinated transportation system may perform the work of connecting parties together. The system may recognize those that have a similar or same traveling itinerary. This may occur through taking navigation instructions from the vehicles and logically combining them into a group. Permission may be needed to obtain access to this information.

Continuing with the above, a screen or display may be used to query whether those parties may want to connect with one another in a caravan. Once or before connected, protocols and other capabilities for each vehicles' hardware may be determined such that the vehicles may be connected. When the shared cabin experience is planned in advance, this information may be input beforehand so that the vehicles may communicate with one another without the period of time to establish these connections.

After registration, at block 114, the vehicles may be synchronized. The parties may also be synchronized immediately or in the future. That is, the shared cabin experience may be provided to the vehicle at different times. In one embodiment, which will be provided in much more detail below, synchronization may occur when a vehicle passes a GPS coordinate. The GPS coordinate may be established by the lead vehicle in the coordinated transportation system, or may also be set by a party following the lead vehicle.

In another embodiment, synchronization may occur at a certain time. For example, a specific date and time may be used. A trip may occur on December $22^{nd}$ at 8:00 AM. The vehicles may then be synchronized to share the same cabin experience at that time.

In the shared cabin experience, different functions may be applied through the vehicles. A function, which may also be referred to as a feature, may be distributed or enabled where the driver or passengers are located. The function may be associated with the cabin 116, seat 118, drive mode 120, or a combination thereof. When the vehicles are synchronized, the experience is not limited to a single function. Rather, a combination of the functions may be enabled or actuated. The functions may include, but are not limited to, a selection of music, sound clip, seat haptic, seat positioning, speaker setting, interior or exterior lighting, image or video for display, and drive mode.

The functions within the cabin 116 for providing the shared cabin experiences may include speakers 122, displays 124, lighting 126 and cameras 128. The speakers 122 may provide audio. This audio may be distributed simultaneously among the vehicles of the coordinated transportation system or at different times. This audio may include a sound clip or music. The speakers 122 may play audio in tandem with video clips, movies, or the like.

One or more displays 124 may be provided within the cabin 116 of the vehicles in the coordinated transportation system. These displays 124 may provide video clips, movies, or the like. The displays 124 may provide other visual information as well, which are beyond video clips and movies. The displays 124 may be provided on a typical instrument cluster or headunit typically found within vehicles.

In one embodiment, synchronization may occur on the displays 124 when a function is provided. The same video clip may be displayed among the two or more vehicles in the coordinated transportation system. In one illustrative example of synchronization, a picture may be shown on the display 124 of each vehicle that approaches a GPS coordinate. A lead vehicle may establish the GPS coordinate along with the picture. The picture may be of a fuel tank or a gas station. When the following vehicle approaches the GPS coordinate, the picture is displayed which may remind the passengers or drivers to fill up their gas tanks.

In another illustrative example, a movie clip may be presented through both the display 124 and the speakers 122 of a vehicle. A passenger or driver in the lead vehicle may recognize the passing location as where a movie was filmed. The driver or passenger may then obtain from their movies a clip of the movie and provide this clip to the following vehicles within the caravan.

Lighting 126 within the cabin 116 of the two or more vehicles of the coordinated transportation system may also be synchronized to provide the shared cabin experience. Different colors may be used for the lighting 126. As an example, the lighting 126 may be changed for the vehicles when passengers or drivers are feeling tired. The lighting 126 may be changed to green or yellow to provide a livelier effect.

Cameras 126 in the cabin 116 of the two or more vehicles of the coordinated transpiration system may also be provided. The shared cabin experience may use these cameras 126 to share images with those vehicles that are registered and synchronized with one another. In an illustrative example, a karaoke experience may be provided by taking in video and audio from the cameras 126 (having microphones) and distributing them to other vehicles.

Continuing with FIG. 1, the seats 118 of the two or more vehicles may be synchronized to provide a shared cabin experience. The seats 118 may actuate functions that may include, but are not limited to, positioning 130 and haptics 132. The seats 118 may also be synchronized with functions associated with the cabin 116 or drive mode 120, which will become apparent from those examples and illustrations provided below.

The positioning 130 of the seats 118 may be changed within the vehicles to enable the shared cabin experience. In an illustrative example, the seats 118 may be positioned such that the passenger or driver looks at a certain direction. The lead vehicle in the coordinated transportation system may want the following vehicles to view a certain object. Passengers or the driver in the vehicle may provide this function from the lead vehicle to the following vehicles. The positioning 130 of the seat 118 may be changed at the same time or at a future time to view the object (for example, a coordinate established by the lead vehicle). Historical landmarks, mountain ranges, animals or the like may be the purpose for positioning 130 the seats 118.

In another illustrative example, positioning 130 of the seats 118 may also be changed to provide a relaxation mode for the vehicles within the coordinated transportation system. The positioning 130 may be changed to upwards such that the parties may look up into a blue sky.

In one embodiment, the positioning 130 of the seats 118 may be coordinated with a video clip, image, sound, or the like. These may be communicated through the speakers 122, display 124, or lighting 126 of the cabin 116. For example, in a synchronized video game multiple systems may be used including, but not limited to, speakers 122, display 124, lighting 126, and positioning 130 of the seat 118.

For synchronization among the vehicles, haptics 132 in the seat 118 may also be used to provide a shared cabin experience. The haptics 132 in the seat 118 may be synchronized to the other functions within the cabin 116 and the seat 118 to provide a unified effect for each of the passengers or drivers in the vehicles. In one example, the seats 118 may entirely vibrate through the haptics 132. A wave effect may also be created through the haptics 132. Haptics 132 may be actuated from one side to the other. The haptics 132 may also be provided through a bottom, back, arm rests, leg area, or the like on the seat 118.

To provide an even further synchronization between the vehicles, the coordinated transportation system may include sharing a drive mode 120. Synchronization may occur through drive modes 120 whereby each vehicle may implement the same or similar modes. In an illustrative example, a caravan may be spread out over a long distance. Some vehicles within the caravan may not know how to switch into snow mode. The lead vehicle of the coordinated transportation system may establish a GPS coordinate whereby the snow mode may be automatically set for the following vehicles removing the need to know how to switch into that mode.

Other modes which may be used include, but are not limited to, a sport mode 134, comfort mode 136 and eco mode 138. These drive modes 120 may be set by the lead vehicle. The comfort mode 136 and eco mode 138 may be set, for example, when a long stretch of road exist. The sport mode 132 may be set when a gaming experience between the vehicles is used. Other modes may exist, which will be described in more details below.

In the coordinated transportation system, the passengers or drivers may not be obligated to synchronize themselves for the shared cabin experience. The passengers or drivers may opt in or out of the experience and chose to do their own forms of entertainment, or none at all. Personalization may be performed by the individuals through the user's personal device. The display 124 within the vehicle may also be used to provide the preference of the passenger or driver. Actuators or other switch mechanisms within the cabin space of the passenger or driver may be used as well.

Figure 2:
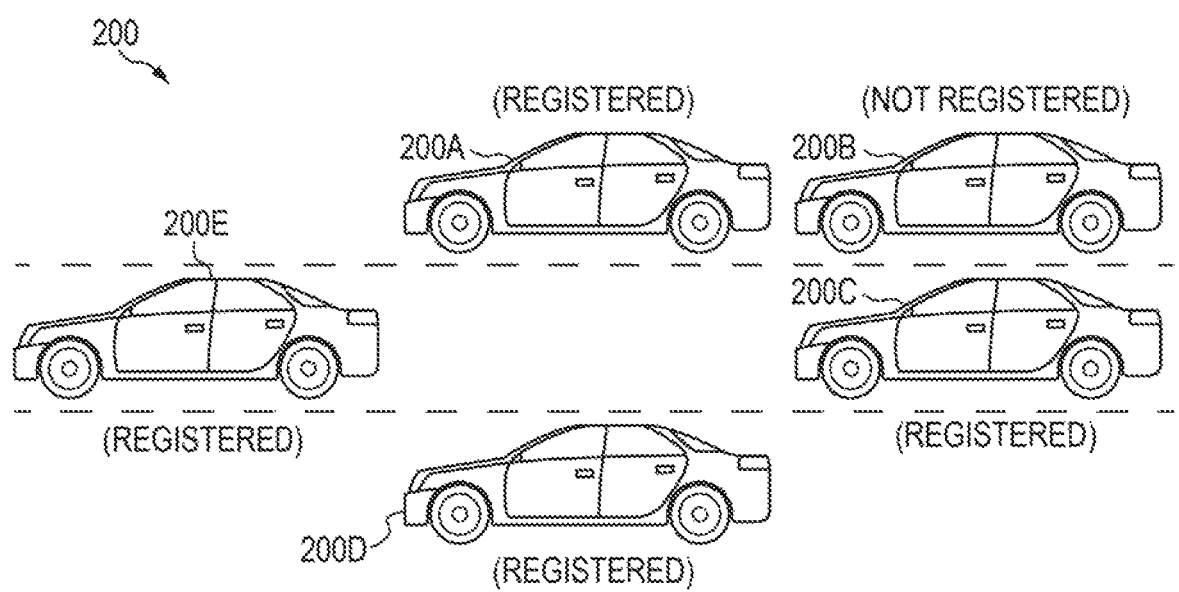
FIG. 2 is a schematic diagram of illustrative vehicles which are registered and not registered for the coordinated transportation system in accordance with one aspect of the present disclosure.

FIG. 2 is a schematic diagram of illustrative vehicles 200A, 200B, 200C, 200D, and 200E (collectively vehicles 200) which are registered and not registered in accordance with one aspect of the present disclosure. Vehicles 200 may be registered before or during the trip when the coordinate transportation system is used. After registration, the vehicles 200 may be synchronized to provide the shared cabin experience.

A local network, remote network, or combination of both may be used to register and synchronize the vehicles 200. Vehicles 200A, 200C, 200D, and 200E may be registered into the shared cabin experience, while the vehicle 200B does not wish to join.

Figure 3:
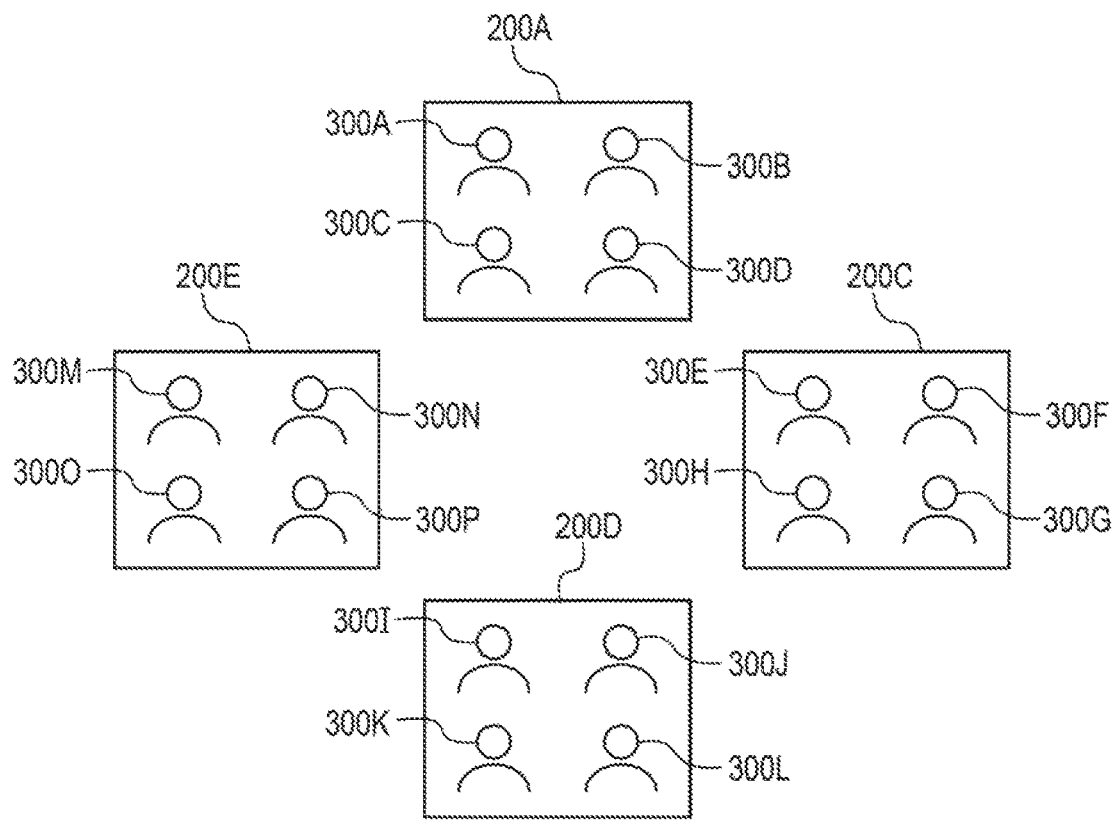
FIG. 3 is a schematic diagram of illustrative passengers or drivers separated by their vehicles in accordance with one aspect of the present disclosure.

Each of the vehicles 200 may have a different amount of passengers or drivers within them. As shown in FIG. 3, a schematic diagram of illustrative passengers or drivers 300A, 300B, 300C, 300D, 300E, 300F, 300G, 300H, 300I, 300J, 300K, 300L 300M, 300N, 300O, and 300P (collectively passengers or drivers 300) separated by their vehicles 200 in accordance with one aspect of the present disclosure is provided. Each of the passengers or drivers 300, within the shared cabin experience, may be separated by a physical barrier, that is, the vehicle 300. Without the coordinated transportation system, the passengers or drivers 300 may not have the shared cabin experience.

Figure 4:
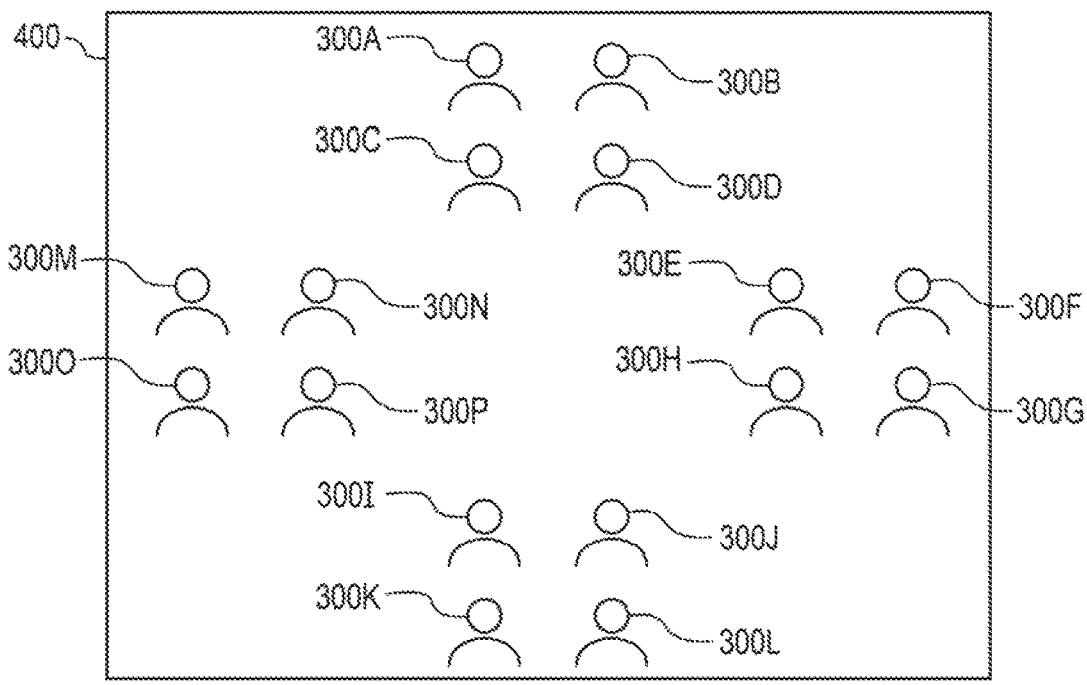
FIG. 4 is a schematic diagram of the illustrative passengers or drivers connected through the coordinated transportation system removing the separation in accordance with one aspect of the present disclosure.

FIG. 4 is a schematic diagram of the illustrative passengers or drivers 300A, 300B, 300C, 300D, 300E, 300F, 300G, 300H, 300I, 300J, 300K, 300L 300M, 300N, 300O, and 3009 connected through the coordinated transportation system removing the separation in accordance with one aspect of the present disclosure. The shared cabin experience 400 may remove the barriers as provided before. The barriers may be removed by those functions which were described above including, but not limited to, the cabin 116, seat 118 and drive mode 120. This may include, but is not limited to, a selection of music, sound clip, seat haptic, seat positioning, speaker setting, interior or exterior lighting, image or video for display, and drive mode to be shared among the vehicles 200.

In one illustrative example, a music clip may be distributed among the vehicles 200 which are registered and synchronized. The clip may be displayed within the cabin 116 on a display 124. In addition, the speakers 122 may provide in tandem music with the clip that is provided for each of the passengers or drivers 300. This may unify the experience 400 among those who participate in the shared cabin experience 400.

Figure 5:
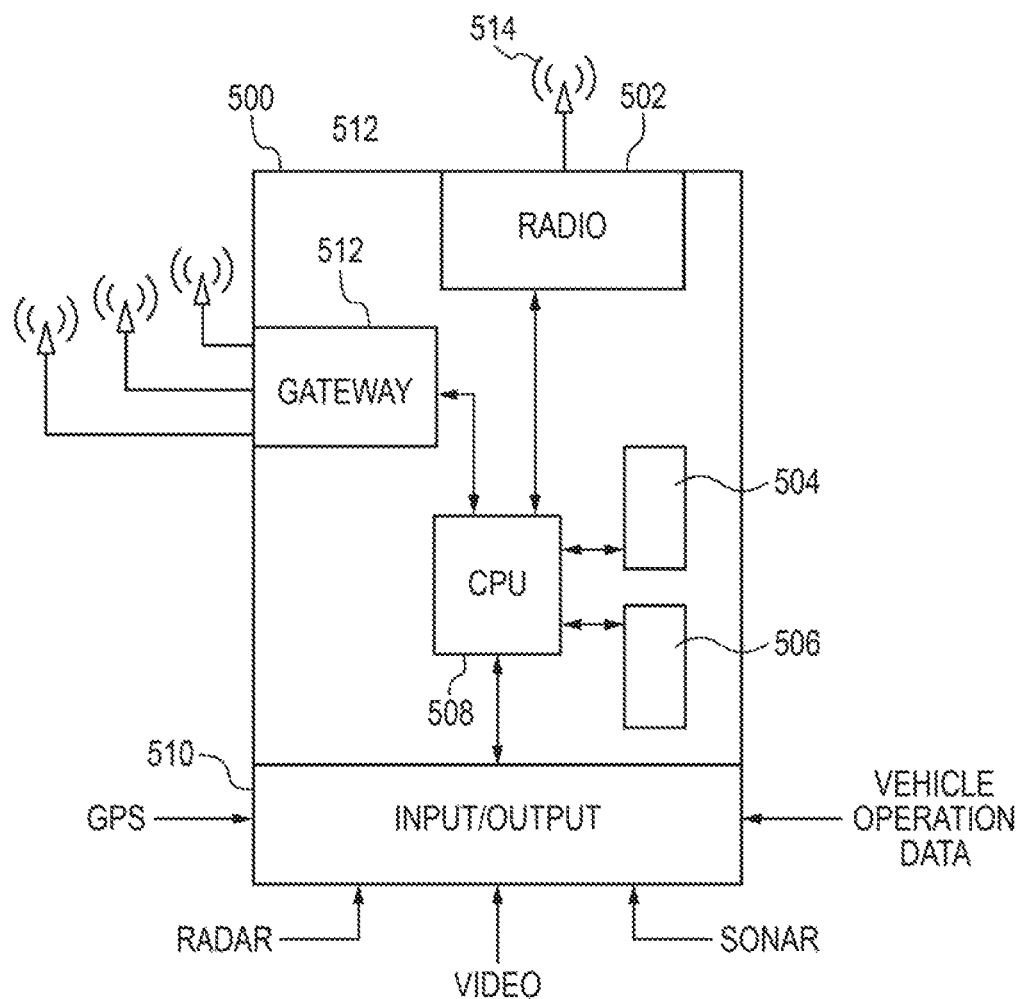
FIG. 5 is a schematic diagram of an illustrative transmitter that may be used for the coordinated transportation system in accordance with one aspect of the present disclosure.

With reference to FIG. 5, a schematic diagram of an illustrative transmitter 500 that may be used for the coordinated transportation system in accordance with one aspect of the present disclosure is provided. The vehicles 200 provided above may each include the transmitter 500 to synchronize with other vehicles and provide the shared cabin experience 400. Fewer or more components may exist in the transmitter 500 and is not necessarily limited to those shown.

The transmitter 500 may include a radio 502 which may send and receive authorized V2V bands and modulations. In one embodiment, but not limiting hereto, a dedicated short-range radio communications (DSRC) wireless protocol may be used to communicate information between vehicles 200 at a range of up to nine hundred and eighty-four (984) feet. A number of other protocols may exist in localized network communications and the transmitter 500 is not limited to such. Furthermore, different hardware may be used as well. s The transmitter 500 may also include non-volatile memory 504 to hold information related to functions that were described earlier. For example, the memory 504 may store information, but is not limited to, a specific sequence for the lighting 126 or a bass level for the speakers 122 for use with a particular function. This information may be stored as part of a preset program within the memory 504 and may be enabled when called upon through a signal or other communication. The memory 504 may store the function permanently or may be rewritten in an Over-the-Air (OTA) update. While the function was described above as being implemented on the vehicle 200, either the lead vehicle or following vehicle, the function may be stored remotely on a server Working memory 506 may be provided in the transmitter 500. This may include random access memory (RAM) where memory may be read and changed to store working data and machine code. The working memory 506 may be used to execute the functions described above. A central processing unit (CPU) 508 within the transmitter 500 may include a processor, or a plurality of processors, that includes digital signal processors (DSPs), for example.

Input/output capabilities 510 may be within the transmitter 500. These may include, but are not limited to, vehicle operation data (such as speed, heading, state of controls, braking, lights, etc.), sonar, radar and video for determining the relative position, heading and speed of nearby vehicles for location and elevation consensus, video or still image input for road documentation, and GPS or another satellite system for course location and timing.

A gateway 512, may provide connectivity to other networks, such as WiFi®, cellular phone and cellular data, Bluetooth®, and the like. This may be used with more remote networks for providing the shared cabin experience 400. A V2V radio antenna 514 may also be provided on the transmitter 500. This may be used when connections are made that are more localized to the vehicles 200.

Figure 6:
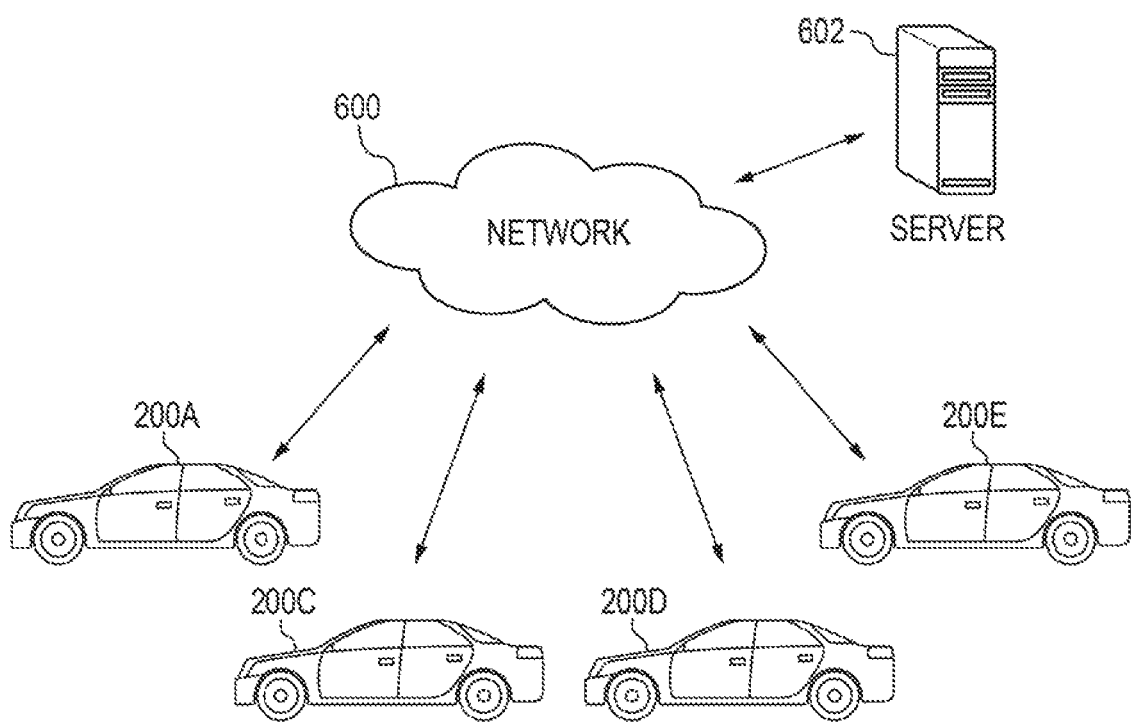
FIG. 6 is a schematic diagram of an illustrative remote network providing the coordinated transportation system in accordance with one aspect of the present disclosure.

Through the transmitter 500, information may be received or provided through a remote or local network. Furthermore, functions may be defined within the vehicles 200 or may be imported from a remote source. FIG. 6 is a schematic diagram of an illustrative remote network 600 providing the coordinated transportation system in accordance with one aspect of the present disclosure. The network 600 may include, but is not limited to, the Internet, intranet, wide-area network (WAN), personal-area network (PAN), campus-area network (CAN), metropolitan area network (MAN), global-area network (GAN), virtual private network, or any other type of network supporting communication between devices described herein. Typically, the remote network 600 is wireless, but may be supported by wireline connections.

The vehicles 200 may be separated by a short or large distance. The coordinated transportation system may work as long as there is a good connection. The vehicles 200A, 200C, 200D and 200E may be connected to the remote network 600 through a wireless connection as shown. Functions may be provided to the vehicles 200. In one illustrative example, the function may be provided from one vehicle 200 to another, for example, vehicle 200A to vehicles 200C, 200D, and 200E. The function may be provided through the remote network 600, or a combination of local area networks and the remote network 600.

In one illustrative example, the remote network 600 may be connected to a server 602 where functions are stored to implement the shared cabin experience. The server 600 may store a number of different functions and they may be called by the vehicles 200. The functions may be broadcasted from the server 600 to each of the transmitters 500. The server 602 may determine those vehicles 200 that have registered before broadcasting the functions.

The server 602 may have similar or the same hardware to the transmitter 500 described above. For example, the server 602 may have hardware to communicate through a gateway. WiFi®, cellular phone and cellular data, Bluetooth®, and the like. The server 602 may also have non-volatile memory and working memory to receive, work on, or provide functions based on requests for the connected transportation system by the vehicles 200.

The server 602 may store registration information for the vehicles 200 and passengers or drivers 300. Information regarding whether a passenger or driver 300 opts in or out of the shared cabin experience 400 may be stored in the server 602. Preferences and other profile information may also be saved. Typically, the server 602 may be connected to a cellular service to handle requests from the vehicles 200.

Figure 7:
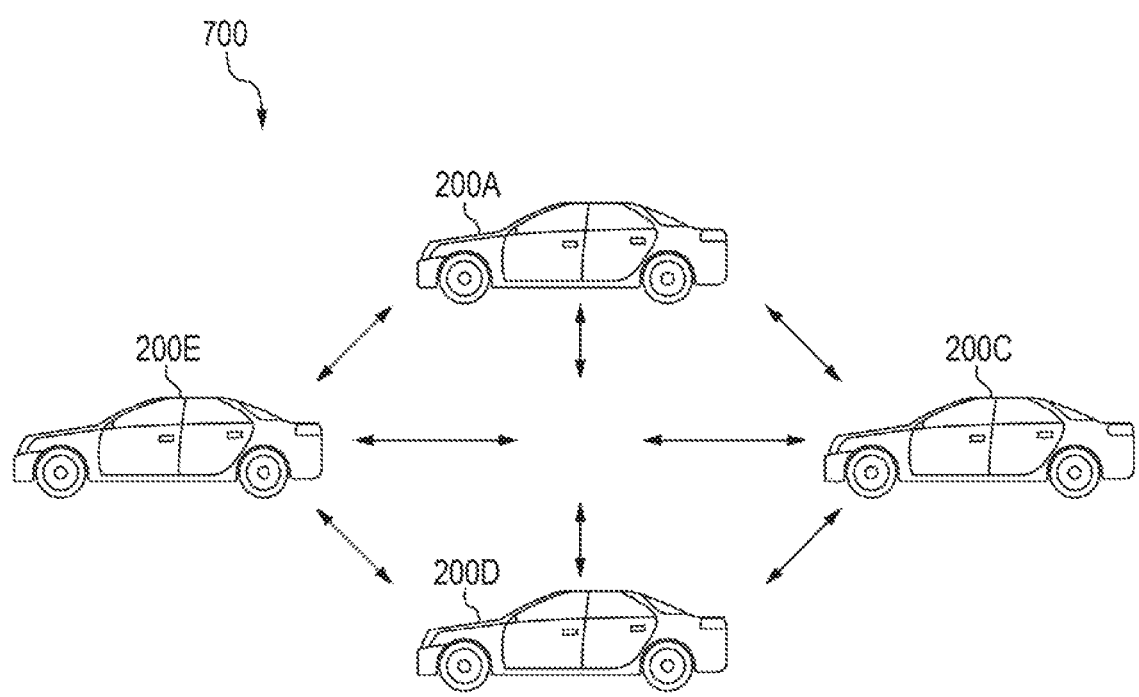
FIG. 7 is a schematic diagram of an illustrative local network providing the coordinated transportation system in accordance with one aspect of the present disclosure.

FIG. 7 is a schematic diagram of an illustrative local network 700 providing the coordinated transportation system in accordance with one aspect of the present disclosure. The local network 700 may be generated from a vehicle-to-vehicle (V2V) communication, Bluetooth® communication, near-field communication (NFC), ultra-wide band communication, or a combination thereof.

A formal network 700 may not exist but may be created through the combination of using the vehicles 200 and their transmitters 500. The local network 700 may be created on top of the vehicles 200 in a distributed fashion. Different functions may be stored locally within the non-volatile memories 504 of the vehicles 200. In one embodiment, the local network 700 may be created such as a virtual network between the vehicles 200.

Figure 8:
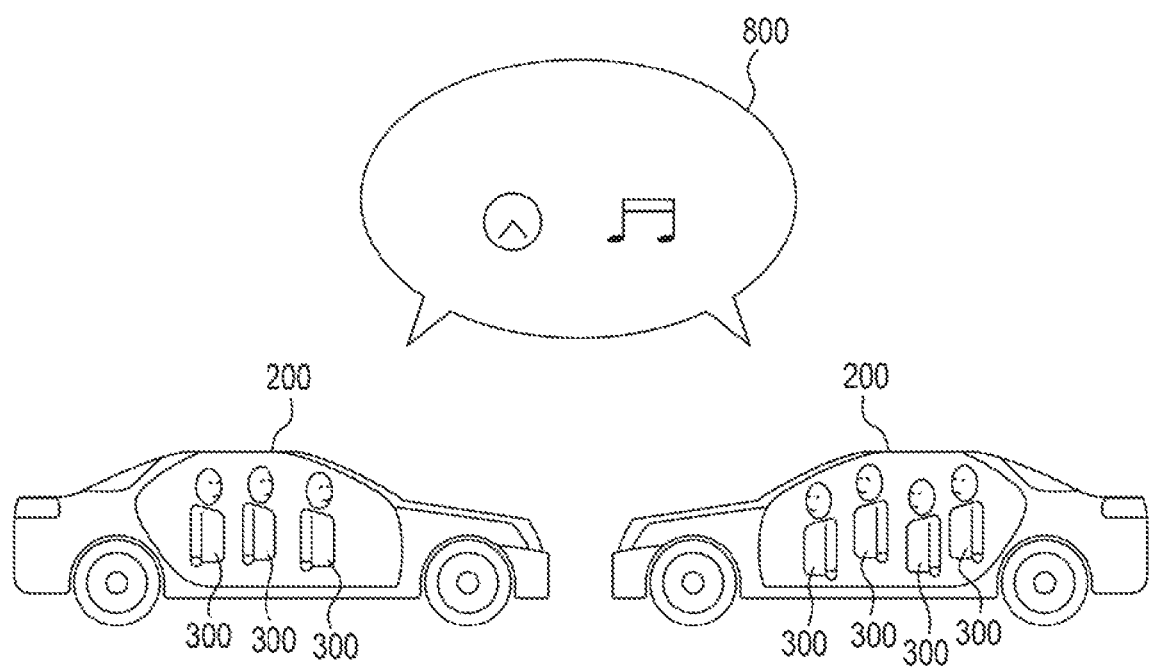
FIG. 8 is a schematic diagram of illustrative vehicles which are registered to the coordinated transportation system to provide navigation and/or music to one another in accordance with one aspect of the present disclosure.

Turning to FIG. 8, a schematic diagram of illustrative vehicles 200 which are registered to the coordinated transportation system to provide navigation and/or music to one another in accordance with one aspect of the present disclosure is provided. The passengers or drivers 300 within each of the vehicles 200 may perform a registration process. The vehicles 200 may be close to one another such that a local network 700 may be used. Alternatively, the remote network 600 may be used as discussed above.

After registration, the functions 800 may be enabled to provide the shared cabin experience 400. These functions 800, for example and as shown, may include navigation instructions, music, or both.

Figure 9:
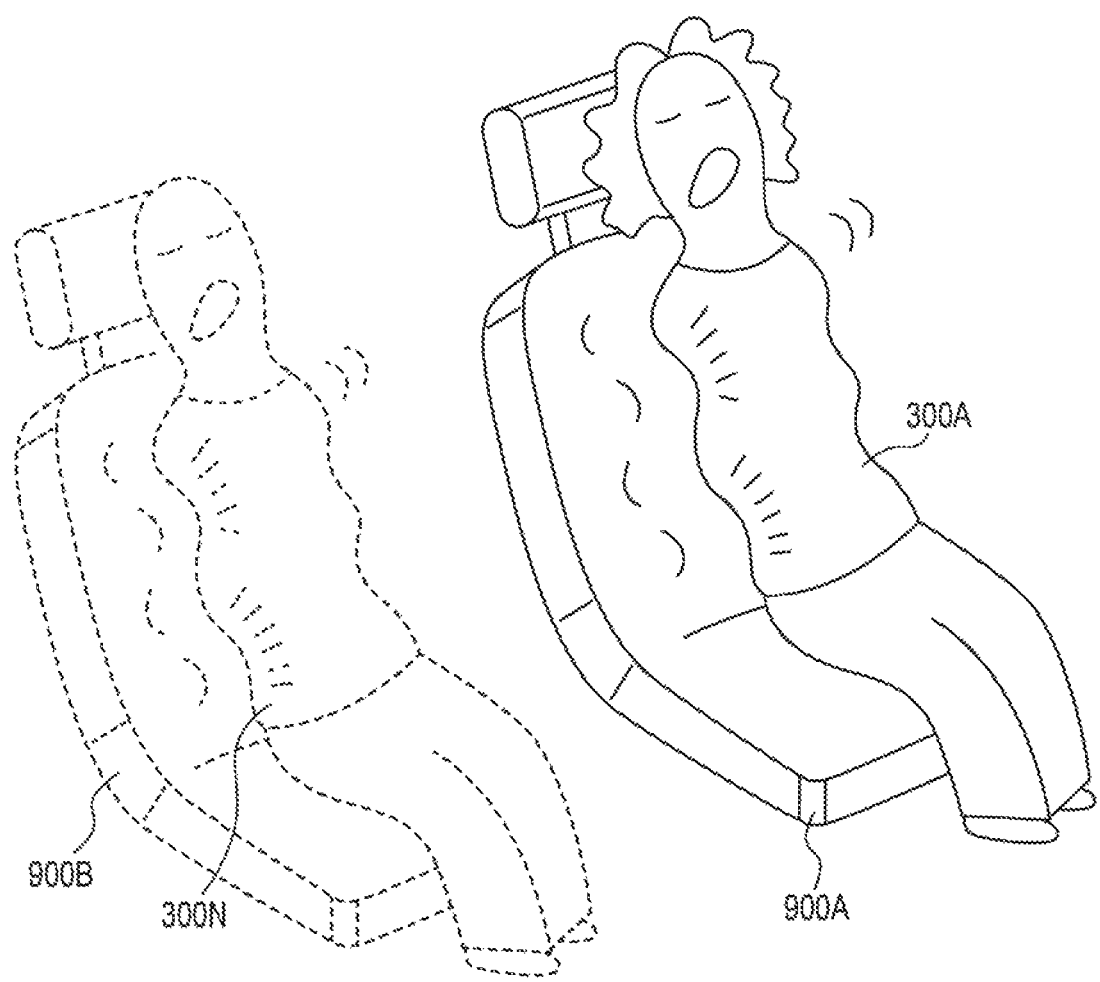
FIG. 9 is a schematic diagram of illustrative passengers or drivers who are registered to the coordinated transportation system to provide similar or the same seat haptics in accordance with one aspect of the present disclosure.

FIG. 9 is a schematic diagram of illustrative passengers or drivers 300 who are registered to the coordinated transportation system to provide similar and/or the same seat haptics 132 in accordance with one aspect of the present disclosure. In an illustrative example, the passenger or driver 300A may be located in vehicle 200A while the passenger or driver 300N may be located in vehicle 200E. The passengers or drivers 300A and 300N are physically located in different vehicles 200A and 200E and a barrier exists between them in the form of steel, materials, and street.

The shared cabin experience 400 may provide the similar or the similar haptic feeling at different vehicles 200A and 200E. This may occur through the haptic seats 900A and 900B (collectively haptic seats 900). Different actuators for the haptics 132 may be placed in the haptic seats 900 along the bottom, back, arm rests, leg area, or the like on the seat 900. The haptic seats 900 may be in tandem with the other functions 800 that may be provided. The actuators may be enabled when a signal is provided. Other forms for placing haptics 132 on the haptic seats 900 may be used. Advantageously, different passengers or drivers 300 may experience the same or similar feeling through the haptic seats 900 in different vehicles 200.

Figure 10:
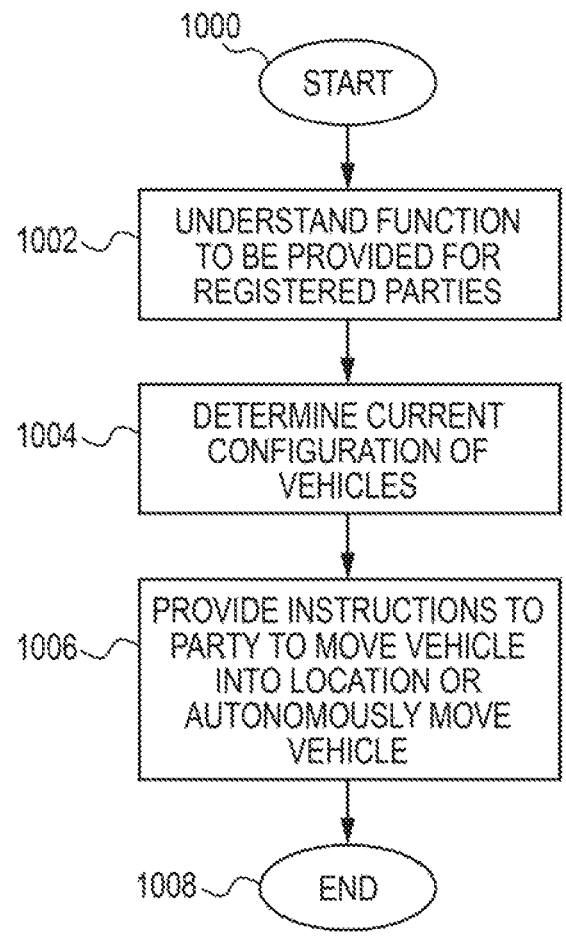
FIG. 10 is a schematic block diagram of an illustrative maneuvering process for connected vehicles to reposition themselves based on functions of the coordinated transportation system in accordance with one aspect of the present disclosure.

With reference now to FIG. 10, a schematic block diagram of an illustrative maneuvering process for connected vehicles 200 to reposition themselves based on functions 800 of the coordinated transportation system in accordance with one aspect of the present disclosure is provided. In the previous shared cabin experience 400, the physical barriers were removed to provide a unique and shared or similar experience 400. The vehicles 200 may further be configured or reconfigured to enhance that experience 400.

The processes may begin at block 1000. In one example, those vehicles 200 that are synced with one another may be brought closer to each other and those that are not may be brought away. At block 1002, the coordinated transportation system may determine which functions 800 may be provided for the registered parties. The functions 800 may not require the use of reconfiguration of the vehicles 200. By reconfiguring the vehicles 200, passengers or drivers 300 may visually see or locate one another outside their vehicles 200.

In an illustrative example, the functions 800 may align the vehicles 200 to execute a racing game. The alignment may be programmed into the function 800 beforehand. Alternatively, the alignment of the vehicles 200 may be dynamic depending on current road conditions. For example, the alignment may conform to a heavy traffic scenario. Aligning the vehicles 200 may be bypassed where the configuration may not be feasible.

At block 1004, and when a maneuver may be used to enhance the shared cabin experience 400, the coordinated transportation system may determine a current configuration of the vehicles 200. Maneuvering may be calculated for each vehicle to form the new configuration as defined by the functions 800. At block 1006, instructions for each of the vehicles 200 within the coordinated transportation system may receive instructions on where to move with respect to one another. Lane information may also be given. This information may be provided in audio through the speakers 122 and/or video through the displays 124 for each of the vehicles 200. The vehicles 200 may move into their perspective positions. The processes may end at block 1008.

In one embodiment, and in a semi-autonomous or autonomous vehicle 200, the vehicles 200 may move automatically into position with respect to one another. Autonomous maneuvers may occur through automated steering, lane understanding, environmental understanding, or time sequences. These maneuvers may be based on three systems: perception, planning, and control. Perception may be the ability of the autonomous vehicle 200 to understand what the raw information coming in through the sensors or components mean. Planning may be the process of making purposeful decisions in order to achieve the autonomous vehicle's goals, typically to bring the vehicle 200 from a start location to a goal location while avoiding obstacles and optimizing over designed heuristics. Finally, control may be the vehicle's ability to execute the planned actions that have been generated by the higher level processes.

Figure 11:
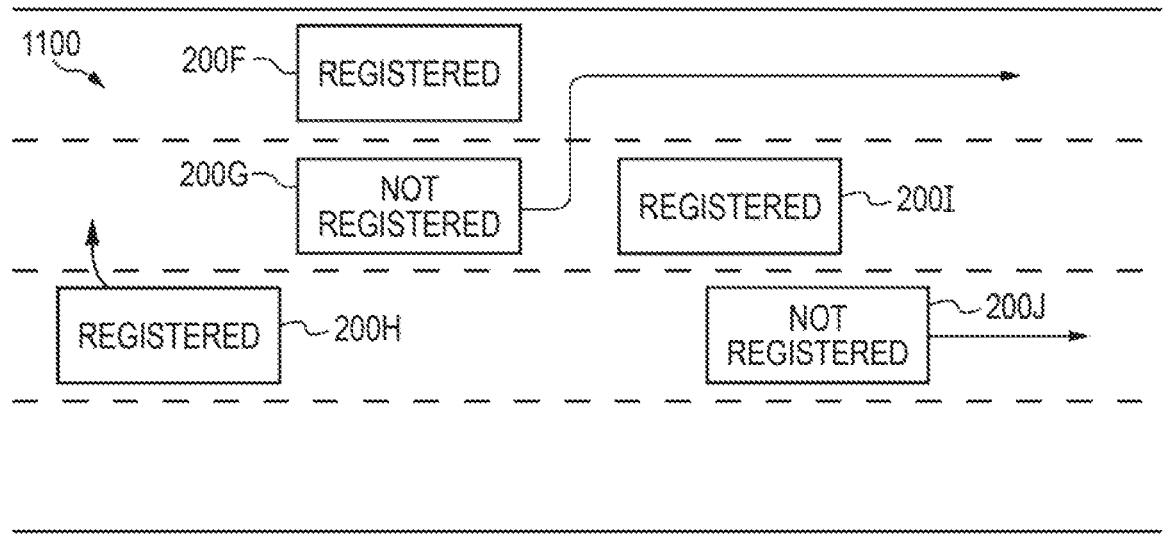
FIG. 11 is a schematic diagram of an illustrative vehicle configuration before maneuvering is performed to provide the coordinated transportation system in accordance with one aspect of the present disclosure.

FIG. 11 is a schematic diagram of an illustrative vehicle configuration 1100 before maneuvering is performed to provide the coordinated transportation system in accordance with one aspect of the present disclosure. In the illustrative example are vehicles 200F, 200G, 200H, 200I, and 200J. Coordinated maneuvers may work in tandem with the functions 800 to enhance the shared cabin experience 400.

Initially, the vehicles 200 of the configuration 1100 may be interspersed. That is, the registered vehicles 200F, 200I, and 200H may be between the non-registered vehicles 200G and 200J. The functions 800 for the shared cabin experience 400 may not be enabled at this particular time. Alternatively, the functions 800 may not require the alignment.

The coordinated transportation system may determine which vehicles 200 are registered and those that are not. Not all vehicles 200 may choose to participate and as will be shown, the non-registered vehicles 200G and 200J may leave the area or move such that the registered vehicles 200F, 200I and 200H may enjoy their experience 400.

For maneuvering, instructions for the vehicles 200 may be provided to align the vehicles 200 in a particular configuration. New experiences 400 may be realized with the provided functions 800. The instructions may be provided within the display 124 of the cabin 116. Instructions in the form of audio may be provided through the speakers 122. Through the instructions, the vehicles 200G and 200J that are not registered may move out of the area while those vehicles 200F, 200I and 200H that are registered are directed to form a new configuration.

Figure 12:
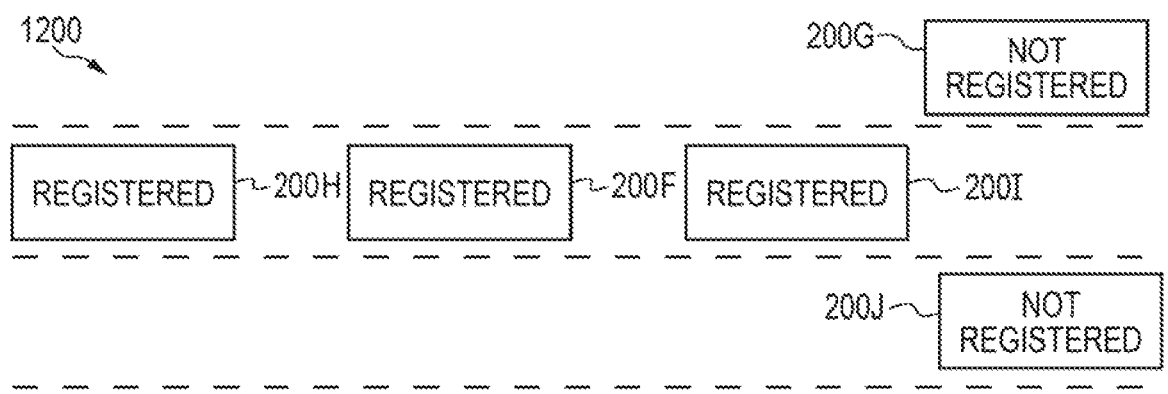
FIG. 12 is a schematic diagram of an illustrative vehicle configuration for the coordinated transportation system aligning the vehicles in accordance with one aspect of the present disclosure.

FIG. 12 is a schematic diagram of an illustrative vehicle configuration 1200 for the coordinated transportation system aligning the vehicles 200 in accordance with one aspect of the present disclosure. The vehicles 200G and 200J may move out of the way while the vehicles 200F, 200I and 200H may form the new configuration 1200. Communications to these vehicles 200G and 200J may be provided through short range communications.

In the shown configuration 1200, the vehicles 200H, 200F, and 200I have formed a single lane in a straight alignment. While this may be on a single middle lane on the freeway or highway, other lanes may be chosen by the coordinated transportation system. In one illustrative example, and to be considerate of other users, the system may choose the slowest lane.

In another illustrative example, the vehicles may be aligned on a carpool lane. The vehicles 200H, 200F, and 200I may change their speed to keep up with faster traffic conditions. In another example, the lane may be selected by the vehicles 200H, 200F, and 200I depending on the surrounding circumstances.

In a semi-autonomous or autonomous vehicle situation, the vehicles 200H, 200F, and 200I of the configuration 1200 may change lanes when they are in the shared cabin experience 400. Coordinated movements between the vehicles 200H, 200F, and 200I switching from lane to lane may be used. Other vehicles 200 may be avoided in such situations.

Lane changes for the configuration 1200 may be dependent on the drive mode 120. When a comfort mode 136 for the vehicles 200H, 200F, and 200I is selected, the slowest lane may be taken. The fastest or carpool lane may be used when the vehicles 200H, 200F, and 200I are in a sport mode 134.

As an illustrative example, the registered vehicles 200H, 200F, and 200I may be aligned in a single lane when the shared cabin experience 400 is a roller coaster. Multiple functions 800 mimicking a roller coaster may be provided. A video may be provided on the display 124 within the cabin 116. The video may show a track. Audio may be played on the speakers 122 to simulate sounds of the roller coaster.

In another illustrative example, the configuration 1200 may simulate a train for younger passengers or drivers 300. Multiple functions 800 may be used. Functions 800 may be used to represent a train. For example, the haptics 132 within the seat 118 may simulate the movement of the train. A video may be provided on the display 124 within the cabin 116 showing train tracks. Audio may be played on the speakers 122 to represent the "Choo Choo" sound.

Figure 13:
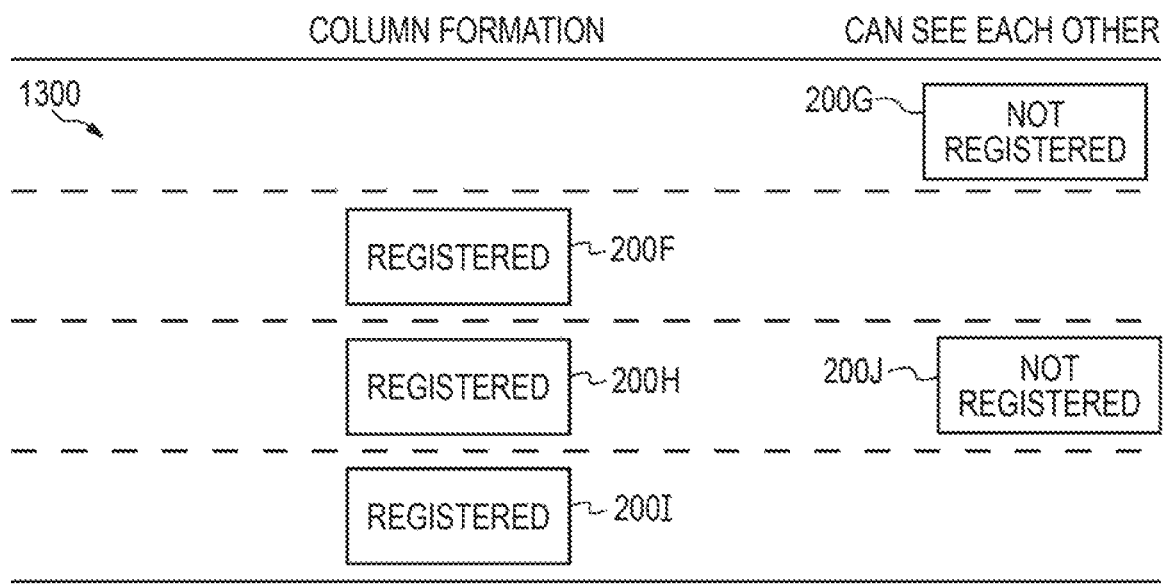
FIG. 13 is a schematic diagram of an illustrative vehicle configuration for the coordinated transportation system stacking the vehicles in accordance with one aspect of the present disclosure.

FIG. 13 is a schematic diagram of an illustrative vehicle configuration 1300 for the coordinated transportation system stacking the vehicles 200 in accordance with one aspect of the present disclosure. Vehicles 200G and 200J may move out of the area as they do not wish to participate or are not registered. Communications to these vehicles 200G and 200J may be provided through short range communications.

In the shown configuration 1300, the vehicles 200H, 200F, and 200I have formed on several lanes in a column format. While shown on the three slowest lanes, the configuration 1300 may be expanded to other lanes. This configuration 1300 may not always be possible as the column format takes a number of lanes. The configuration 1300 may be dynamically adjusted based on the road users at the time such that the vehicles 200H, 200F, and 200I do not block the entire road.

In one illustrative example, the functions 800 with the configuration 1300 may be used to implement a racing game. Each party 300 may be able to view the other vehicle 200 that they are racing against in the shared cabin experience 400. Sounds or audio may be provided through the speakers 122 of the cabin 116 to simulate the racing environment. Furthermore, the haptics 132 in the seat 118 may vibrate to reproduce the racing environment such as turns, bumps, or the like.

While two configurations 1200 and 1300 were shown above, other configuration may exist. The configurations may be made such that vehicles 200 may be reconfigured to enhance the shared cabin experience 400. Visually, each of the passengers or drivers 300 may see one another and still feel or experience the effects of the shared functions 800.

Figure 14:
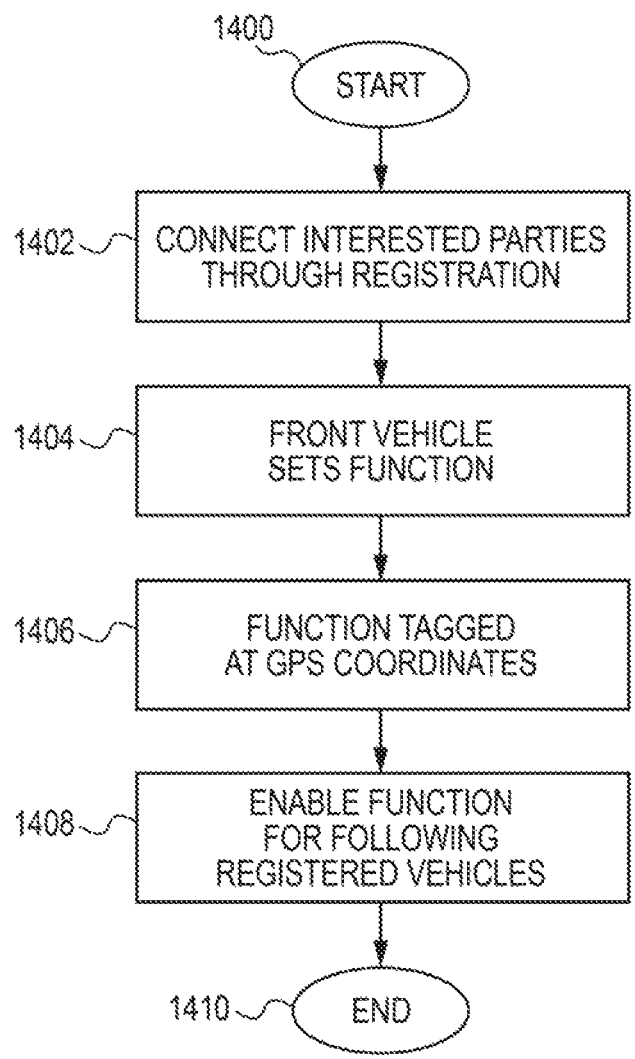
FIG. 14 is a schematic block diagram of an illustrative process for providing functions based on global positioning system (GPS) coordinates in accordance with one aspect of the present disclosure.

FIG. 14 is a schematic block diagram of an illustrative process for providing functions based on GPS coordinates in accordance with one aspect of the present disclosure. Previously, functions 800 were shared when the vehicles 200 were near one another. The shared cabin experience 400 may be implemented where vehicles 200 are separated by a large distance. As such, the passengers or drivers 300 do not necessarily have to be near one another to share the same or similar experience 400. The processes may begin at block 1400.

At block 1402, the coordinated transportation system may connect the interested parties 300 through a registration or preregistration process. A number of different interfaces having GUIs may be used to accomplish the registration process. This may either occur on a user's smartphone, laptop, or other personal device. Connections with these devices to enable the shared cabin experience 400 may occur remotely or locally.

The front vehicle 200, at block 1404, may set functions 800. This may occur as the vehicle 200 passes by a specific GPS coordinate. In one embodiment, the following vehicles 200 may set the function 800 such that when the lead vehicle 200 approaches a GPS coordinate those functions 800 may be enabled.

At block 1406, the functions 800 may be tagged at a particular GPS coordinate. This may occur when the lead vehicle 200 passes by a particular place of interest (POI). At block 1408, the functions 800 set by the lead vehicle 200 may be enabled for the following vehicles 200. Specific examples will be provided below. The processes may end at block 1410.

Figure 15:
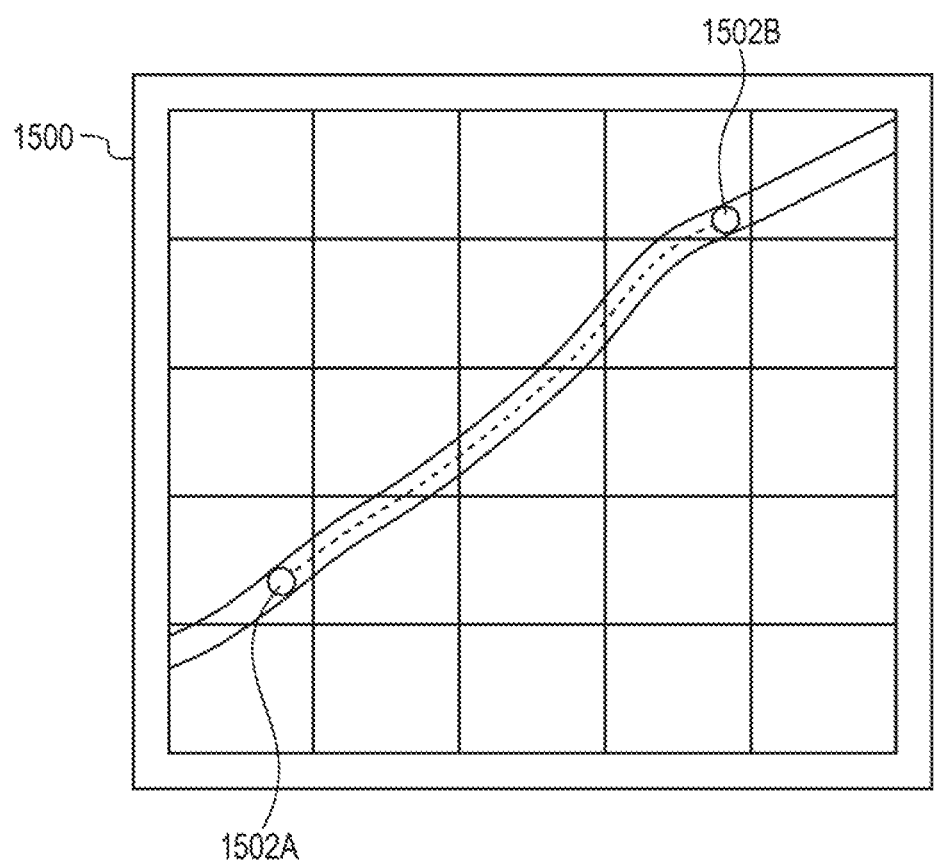
FIG. 15 is a schematic diagram of an illustrative map showing functions that may be provided based on GPS coordinates in accordance with one aspect of the present disclosure.

FIG. 15 is a schematic diagram of an illustrative map 1500 showing functions 800 that may be provided based on GPS coordinates 1502A and 1502B in accordance with one aspect of the present disclosure. As shown on the map 1500, a front vehicle 200 may be located at coordinates 1502B which is before coordinates 1502A where a following vehicle 200 may be located.

Functions 800 may be set by the lead vehicle 200 at the coordinates 1502B. At this point, the vehicles 200 may be far apart and may not be able to see one another, but still wish to have the shared cabin experience 400.

In one illustrative example, a route may be set by the front vehicle 200 such that the following vehicles 200 may take that route. The route may be defined at the coordinates 1502B. The following vehicles 200 may use this point as an instruction to take a route defined by the lead vehicle 200. Typically, a function 800 for a shared cabin experience 400 may be provided to the following vehicles 200.

Figure 16:
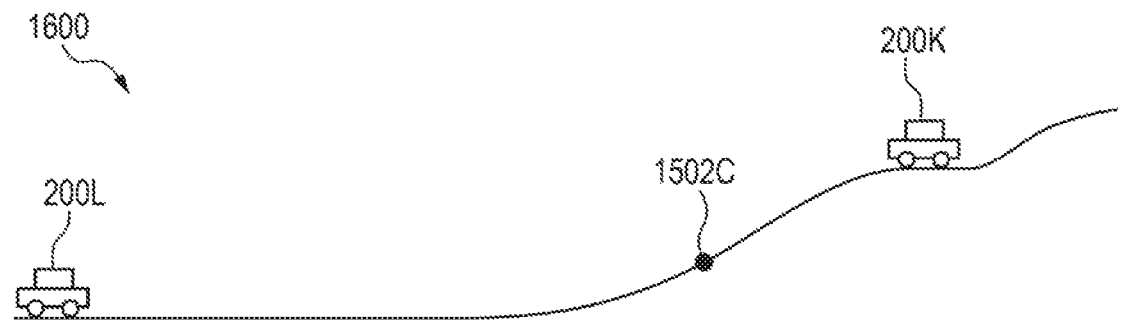
FIG. 16 is a schematic diagram of an illustrative terrain scenario setting a different mode in accordance with one aspect of the present disclosure.

FIG. 16 is a schematic diagram of an illustrative terrain scenario 1600 setting a different mode in accordance with one aspect of the present disclosure. As provided earlier, different drive modes 120 may exist. These may include, but are not limited to, the sport mode 134, comfort mode 136, and eco mode 138. When driving uphill, a gear change may be required. Typically, a lower gear may be implemented to avoid engine struggles. D1, D2, or D3 gears may be used to maintain higher RPMs and give the vehicle 200 climbing power and speed.

In the terrain scenario 1600, functions 800 for an uphill mode may be established at a coordinate 1502C by a lead vehicle 200K. The coordinated transportation system may provide the shared cabin experience 400 by activating the uphill mode using the functions 800 automatically for the following vehicles 200, such as the vehicle 200L. The functions 800 may not be activated until the following vehicles 200 reach the GPS coordinate 1502C. Advantageously, this may relieve the burdens of how to change the drive mode 120 for the following vehicles 200. Similarly, functions 800 may be enabled when the following vehicles 200 are going downhill.

Figure 17:
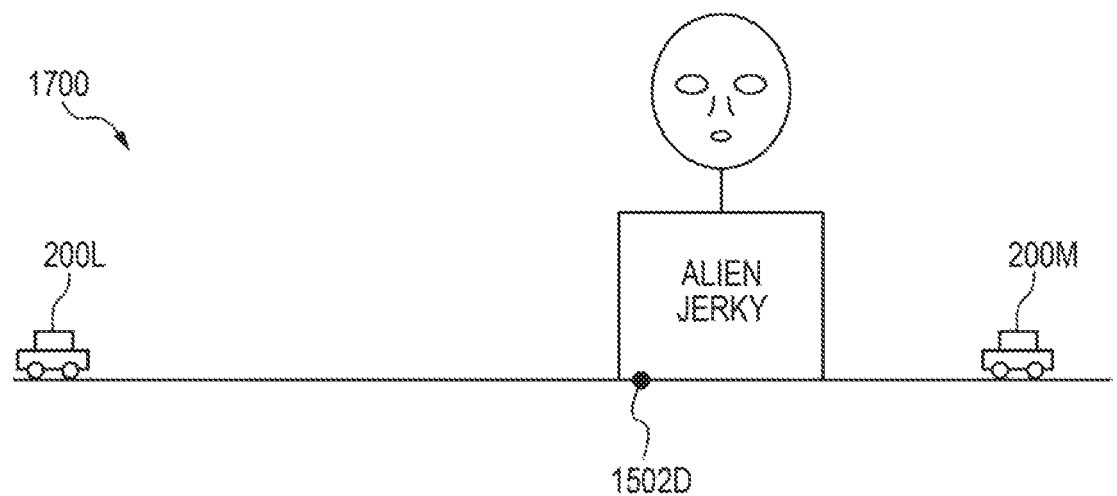
FIG. 17 is a schematic diagram of an illustrative place of interest (POI) scenario for setting different music, video, and/or image in accordance with one aspect of the present disclosure.

FIG. 17 is a schematic diagram of an illustrative POI scenario 1700 for setting different music, video, and/or image in accordance with one aspect of the present disclosure. These functions 800 may also be established based on a coordinate 1502D that has been tagged by a lead vehicle 200M. In the scenario 1700, a lead vehicle 200M has placed different music, video, and/or image associated with a POI, which is shown as an "Alien Jerky" shop. The functions 800 may provide alien imagery or music through the speakers 122, display 124 or lighting 126 of the cabin 116.

After establishing the image or music at the coordinate 1502D, those registered vehicles 200 within the coordinated transportation system may be able to import the functions 800. The functions 800 may be established by the lead vehicle 200M or others may set the functions at the coordinate 1502D. The functions 800 may be tied to the POI as well. The following vehicles 200, such as the vehicle 200N, may enable or actuate the functions 800 after it passes by the coordinate 1502D. If the lead vehicle 200M did not set the image or music, it may also actuate the functions 800 after it passes the coordinates 1502D. Through this, a shared cabin experience 400 is provided.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vehicle comprising:
   a transceiver;
   at least one processor;
   a memory operatively coupled to the processor, the memory storing program instructions that when executed by the processor, causes the processor to:
   register with at least two other vehicles;
   connect to the at least two other vehicles through the transceiver;
   maneuver the at least two other vehicles with the vehicle to form a column of vehicles across several lanes;
   define a function for sharing; and
   transmit the function to the at least two other vehicles through the transceiver within the column of vehicles, wherein the function is associated with a positioning of each vehicle within the column of vehicles.

2. The vehicle of claim 1, wherein the function for sharing comprises a racing game.

3. The vehicle of claim 1, wherein transmitting the function to the at least two other vehicles through the transceiver comprises communicating the function through a local network, the transmitter providing or receiving at least one of a vehicle-to-vehicle (V2V) communication, Bluetooth® communication, near-field communication (NFC), ultra-wide band communication, and a combination thereof.

4. The vehicle of claim 1, wherein transmitting the function to the at least two other vehicles through the transceiver comprises communicating the function through a remote network, the transmitter providing or receiving communications through a cellular network.

* * * * *